(12) United States Patent
Hashimoto et al.

(10) Patent No.: US 6,629,230 B2
(45) Date of Patent: Sep. 30, 2003

(54) HOST INTERFACE CIRCUIT

(75) Inventors: Takashi Hashimoto, Fukuoka (JP); Yasuo Kohashi, Fukuoka (JP)

(73) Assignee: Matsushita Electric Industrial Co., Ltd. (JP)

( * ) Notice: Subject to any disclaimer, the term of this patent is extended or adjusted under 35 U.S.C. 154(b) by 321 days.

(21) Appl. No.: 09/871,144

(22) Filed: May 30, 2001

(65) Prior Publication Data
US 2002/0016898 A1 Feb. 7, 2002

(30) Foreign Application Priority Data
May 30, 2000 (JP) ........................................ 2000-160828

(51) Int. Cl.⁷ .............................................. G06F 12/00
(52) U.S. Cl. ........................ 711/202; 711/202; 712/210
(58) Field of Search ................................ 711/200, 202, 711/205–207, 101, 171; 712/23, 35–37, 210, 225

(56) References Cited
FOREIGN PATENT DOCUMENTS

JP 05175999 7/1993
JP 07084968 3/1995

Primary Examiner—Nasser Moazzami
(74) Attorney, Agent, or Firm—Parkhurst & Wendel, L.L.P.

(57) ABSTRACT

In a host interface circuit performing data transmission/reception between an external host controller and a device connected to the external host controller, the external host controller generates, as external addresses to be supplied to the connected device, first addresses corresponding to the respective internal addresses in an internal storage space of the connected device, and a specific second address corresponding to internal addresses of a series of areas in the internal storage space; and the host interface circuit includes a first address conversion circuit for converting the first addresses into the internal addresses in the internal storage space, and a second address conversion circuit for converting the specific second address into the internal addresses in the internal storage space; and the specific second address is used when the external host controller makes continuous access to the serial areas in the internal storage space of the connected device. Therefore, the external host controller can make continuous access to a series of areas in the internal storage space of the connected device by using the specific address, without using DMA, between the external host controller and the host interface circuit. As the result, power consumption is reduced, and complexity in software processing is reduced.

5 Claims, 12 Drawing Sheets

Fig.6(a)
two-dimensional array data

| D(0,0) | D(1,0) | ····· | D(s-1,0) |
|--------|--------|-------|----------|
| D(0,1) | D(1,1) | ····· | D(s-1,1) |
| D(0,2) | D(1,2) | ····· | D(s-1,2) |
| D(0,3) | D(1,3) | ····· | D(s-1,3) |
| D(0,4) | D(1,4) | ····· | D(s-1,4) |
| ⋮ | ⋮ | ⋮ | ⋮ |
| D(0,t-3) | D(1,t-3) |  | D(s-1,t-3) |
| D(0,t-2) | D(1,t-2) | ····· | D(s-1,t-2) |
| D(0,t-1) | D(1,t-1) | ····· | D(s-1,t-1) |

Fig.6(b)
memory storage order internal adresses

| D(0,0) | s |
|--------|---|
| D(0,1) | |
| D(0,2) | |
| D(0,3) | |
| D(0,4) | |
| ⋮ | |
| D(0,t-3) | |
| D(0,t-2) | |
| D(0,t-1) | |
| D(1,0) | s+t |
| D(1,1) | |
| D(1,2) | |
| D(1,3) | |
| D(1,4) | |
| ⋮ | |
| D(1,t-3) | |
| D(1,t-2) | |
| D(1,t-1) | |
| D(2,0) | s+2t |

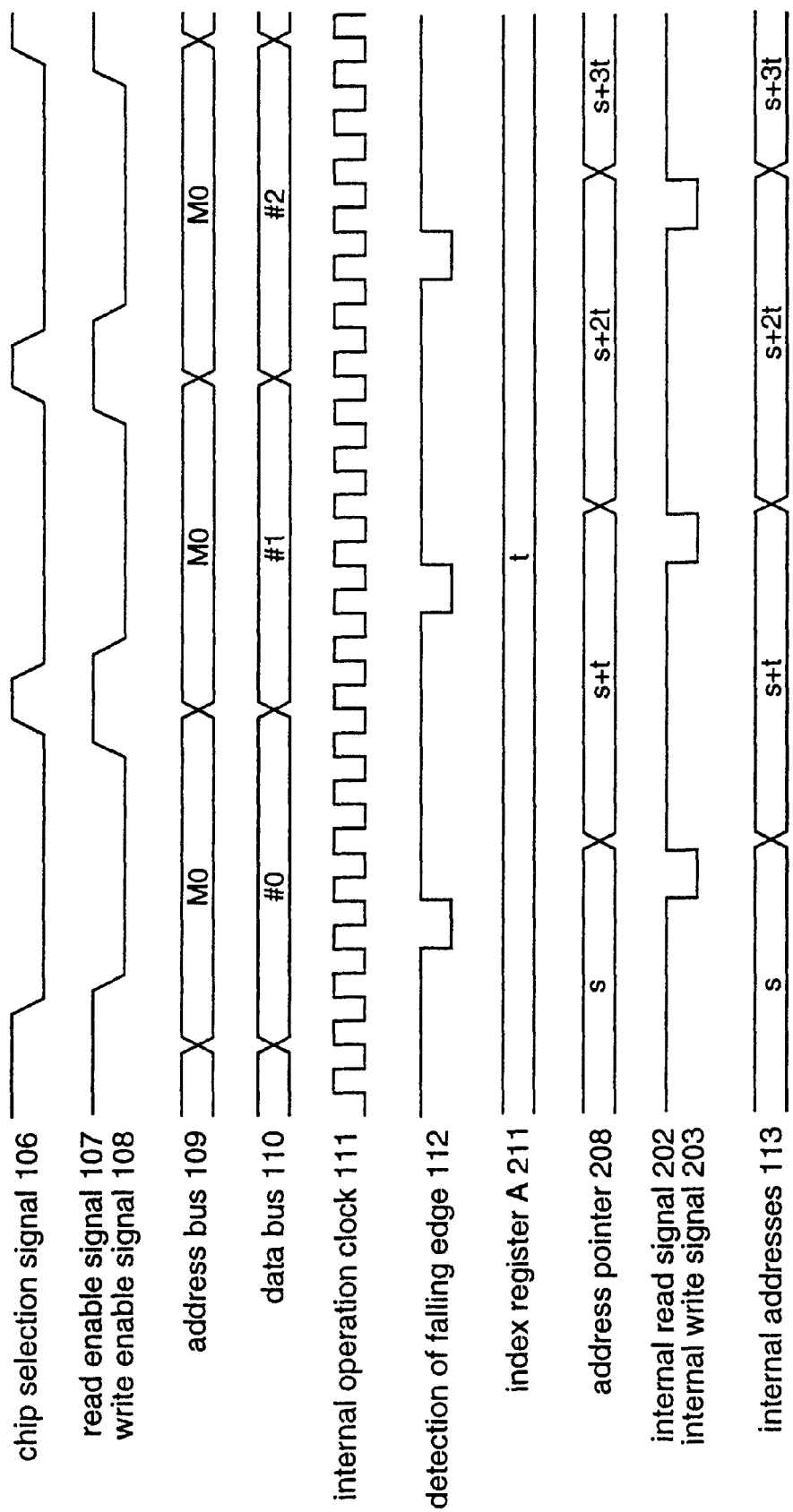

HOST INTERFACE CIRCUIT

FIELD OF THE INVENTION

The present invention relates to an interface circuit that performs data transmission and reception between an external host controller and a device connected to the external host controller.

BACKGROUND OF THE INVENTION

A conventional host interface circuit, which is mounted on a device connected to an external host controller such as a microcomputer, brings addresses in an internal storage space of the connected device into one-to-one correspondence with addresses in an internal storage space of the external host controller. Therefore, when the external host controller reads or writes data from/into the connected device, the external host controller generates external addresses corresponding to the respective internal addresses in the internal storage space of the connected device, thereby performing data reading or writing.

Hereinafter, a description will be given of data transmission/reception between a conventional external host controller and a device connected to the external host controller, with reference to FIGS. 10 and 11.

FIG. 10 is a block diagram illustrating an external host controller 100 and a device 101 connected to the controller 100, and FIG. 11 is a timing chart for explaining continuous access to a series of areas in an internal storage space in the connected device.

With reference to FIG. 10, the external host controller 100 includes a bus controller 102, and an internal storage space 104. The device 101 connected to the external host controller 100 includes a host interface circuit 103, and an internal storage space 105.

Further, a chip selection signal 106, a read enable signal 107, and a write enable signal 108 are outputted from the external host controller 100 to the host interface circuit 103 of the connected device 101. An address bus 109 and a data bus 110 connect the external host controller 100 to the host interface circuit 103 of the device 101. Further, 111 denotes an internal operating clock of the connected device 101.

When the external host controller 100 so constructed reads data stored in the internal storage space 105 of the connected device 101, initially, the external host controller 100 generates an external address corresponding to each of the internal addresses 113 in the internal storage space 105 of the connected device 101, a chip selection signal 106, and a read enable signal 107, which signals correspond to the external address. Then, the host interface circuit 103 detects the falling edge of the read enable signal 107 from the external host controller 100, in synchronization with the internal operation clock 111 (112 in FIG. 11). Thereby, the host interface circuit 103 judges that the external host controller 100 makes access to the internal storage space 105 of the connected device 101, and generates an internal address 113 in the internal storage space 105 corresponding to the external address to perform reading of data.

For example, it is assumed that the external host controller 100 generates external addresses N, N+1, N+2, . . . corresponding to a series of areas in the internal storage space 105 of the connected device 101, as shown in the timing chart of FIG. 11. The host interface circuit 103 detects the falling edges of the chip selection signal 106 and the read enable signal 107 (112 in FIG. 11), which are supplied from the external host controller 100 operating on a clock different from the internal operation clock 111, and judges that the external host controller 100 makes access. Then, an address generation circuit in the connected device 101 generates internal addresses s, s+1, s+2, . . . corresponding to the external addresses N, N+1, N+2, . . . , respectively, thereby performing continuous access to the serial areas in the internal storage space 105.

Meanwhile, there is direct memory access (hereinafter referred to as DMA) as another method of making continuous access to a series of areas in the internal storage space of the device connected to the external host controller. FIG. 12 is a block diagram illustrating a hardware structure performing DMA.

With reference to FIG. 12, DMA is direct data transmission/reception between an external device connected to an external host controller and a memory, without the intervention of the external host controller. To perform DMA transfer, setting on a DMA controller is carried out by software of the external host controller through the following steps: (1) setting a head address of a transfer data area on the memory, in a memory address counter; (2) setting the number of words to be transferred, in a number-of-words counter; (3) setting either "reading" or "writing" in a control register in a control circuit; (4) making a transfer start instruction.

After the above-described setting, the DMA controller increments the memory address counter while decrementing the number-of-words counter until the count of the number-of-words counter becomes 0, thereby making continuous access to a series of areas in the internal storage space of the external device connected to the external host controller.

Since, in DMA, the external host controller doesn't need to directly control data transmission/reception, the load on the external host controller is not so great. However, it is necessary to make interruption to the external host controller when DMA transfer is ended. Further, since the external host controller and the DMA controller basically operate independently from each other, there is a possibility of competition for memory access. Therefore, DMA requires a memory bus controller to arbitrate competition for memory access between the external host controller and the DMA controller.

As described above, when performing data transmission/reception between the external host controller and the device connected to the external host controller by using the conventional host interface circuit, the addresses corresponding to the internal storage space of the external host controller are brought into one-to-one correspondence with the addresses corresponding to the internal storage space of the connected device. Therefore, when the external host controller makes continuous access to a series of areas in the internal storage space in the connected device, the external host controller must generate individual external addresses corresponding to the respective internal addresses in the internal storage space of the connected device. Accordingly, signal transition occurs on the external address bus every time access is made to the internal address in the internal storage space of the connected device, resulting in power consumption due to the signal transition on the external address bus.

Further, when performing transmission/reception of plural data streams between the external host controller and the device connected to the external host controller, the external host controller must generate and manage external addresses corresponding to the internal storage space of the connected device, for every data stream to be transmitted/received, to make access to the connected device. Therefore, the processing by software of the external host controller is complicated.

On the other hand, although continuous access to a series of areas by DMA is efficient, since special DMA controller and memory bus controller are required in addition to the conventional bus controller and interface circuit, the hardware scale is increased. Further, since interruption or the like is required, the software processing is complicated.

Accordingly, if the external host controller has processing ability enough and to spare, it might be better not to use DMA. However, as mentioned above, the conventional host interface circuit has the problem of power consumption due to the signal transition on the external address bus.

SUMMARY OF THE INVENTION

The present invention is made to solve the above-described problems and has for its object to provide a host interface circuit that performs data transmission/reception via a bus controller circuit of an external host controller, without the need for a DMA controller and a memory bus controller, and that significantly reduces signal transitions on the external address bus to reduce the power consumption, and prevents the software processing of the external host controller from being complicated.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a host interface circuit performing data transmission/reception between an external host controller and a device connected to the external host controller in such a manner that each address and data to be transmitted/received is accompanied with a chip selection signal indicating that the external host controller makes access to the device connected to the external host controller, and a read enable signal or a write enable signal, wherein the external host controller generates, as external addresses to be supplied to the device connected to the external host controller, first addresses corresponding to the respective internal addresses in an internal storage space of the device connected to the external host controller, and a specific second address corresponding to internal addresses of a series of areas in the internal storage space; the host interface circuit includes a first address conversion circuit for converting the first addresses into the internal addresses in the internal storage space, and a second address conversion circuit for converting the specific second address into the internal addresses in the internal storage space; and the specific second address is used when the external host controller makes continuous access to the serial areas in the internal storage space of the device connected to the external host controller. Therefore, when the external host controller makes continuous access to a series of areas in the internal storage space of the device connected to the controller, continuous access to the areas in the internal storage space of the connected device is achieved using the specific address, without using DMA, between the external host controller and the host interface circuit. As the result, power consumption is reduced, and complexity in software processing is reduced.

According to a second aspect of the present invention, in the host interface circuit according to the first aspect, the external host controller generates a plurality of specific second addresses corresponding to different kinds of data to be transmitted/received, respectively, as external addresses to be supplied to the device connected to the external host controller; and the host interface circuit includes a plurality of second address conversion circuits corresponding to the respective specific second addresses. Therefore, when the external host controller makes continuous access to a series of areas in the internal storage space of the device connected to the controller, the external host controller can properly use a specific address for each of plural data streams to be transmitted/received between the external host controller and the device connected to the controller, whereby complexity in software processing on the plural data streams is reduced.

According to a third aspect of the present invention, in the host interface circuit according to the first aspect, the second address conversion circuit is provided with plural kinds of address generation methods for generating the internal addresses in the internal storage space corresponding to the specific second address, and generates the internal addresses corresponding to the specific second address by using any of the address generation methods according to setting of the external host controller. Since the external host controller specifies the address generation method, the external host controller can control the order of continuous access to a series of areas in the internal storage space of the device connected to the controller, whereby power consumption due to signal transition on an external address bus is reduced, and complexity in software processing in the external host controller is reduced.

According to a fourth aspect of the present invention, in the host interface circuit according to the second aspect, each of said second address conversion circuits is provided with plural kinds of address generation methods for generating the internal addresses in the internal storage space corresponding to the specific second address, and generates the internal addresses corresponding to the specific second address by using any of the address generation methods according to setting of the external host controller. Since the external host controller specifies the address generation method, the external host controller can control the order of continuous access to a series of areas in the internal storage space of the device connected to the controller, whereby power consumption due to signal transition in an external address bus is reduced, and complexity in software processing in the external host controller is reduced.

According to a fifth aspect of the present invention, in the host interface circuit according to any of the first to fourth aspects, the host interface circuit further includes a register for setting an access cycle to a control signal which continuously asserts the read enable signal or the write enable signal during continuous transmission/reception of plural data by the external host controller, and a control circuit for controlling reading or writing of data from/into the internal storage space, according to the value set in the register; and when the external host controller continuously performs transmission/reception of plural pieces of data using the second address, with the device connected to the external host controller, the host interface circuit performs, under control of the control circuit, reading or writing of the respective data from the internal addresses generated by the second address conversion circuit. Therefore, the respective data, which are continuously transmitted/received using the specific address, can be read or written from/into the respective addresses in the internal storage space, whereby power consumption is reduced.

BRIEF DESCRIPTION OF THE DRAWINGS

FIGS. 6(a) and 6(b) are diagrams for explaining data storage positions when two-dimensional array data are stored in an internal storage space that is a one-dimensional array.

FIG. 7 is a timing chart for explaining data transmission/reception between the host interface circuit according to the third embodiment and an external host controller.

DETAILED DESCRIPTION OF THE PREFERRED EMBODIMENTS

Hereinafter, the preferred embodiments of the present invention will be described with reference to the drawings. The embodiments of the present invention employs, as a device connected to an external host controller, a video coding/decoding apparatus that requires transmission/reception of a large amount of data such as coded video data.

[Embodiment 1]

Hereinafter, a first embodiment of the present invention will be described.

First of all, the structure of a host interface circuit according to the first embodiment of the invention will be described with reference to FIG. 1.

Figure 1:
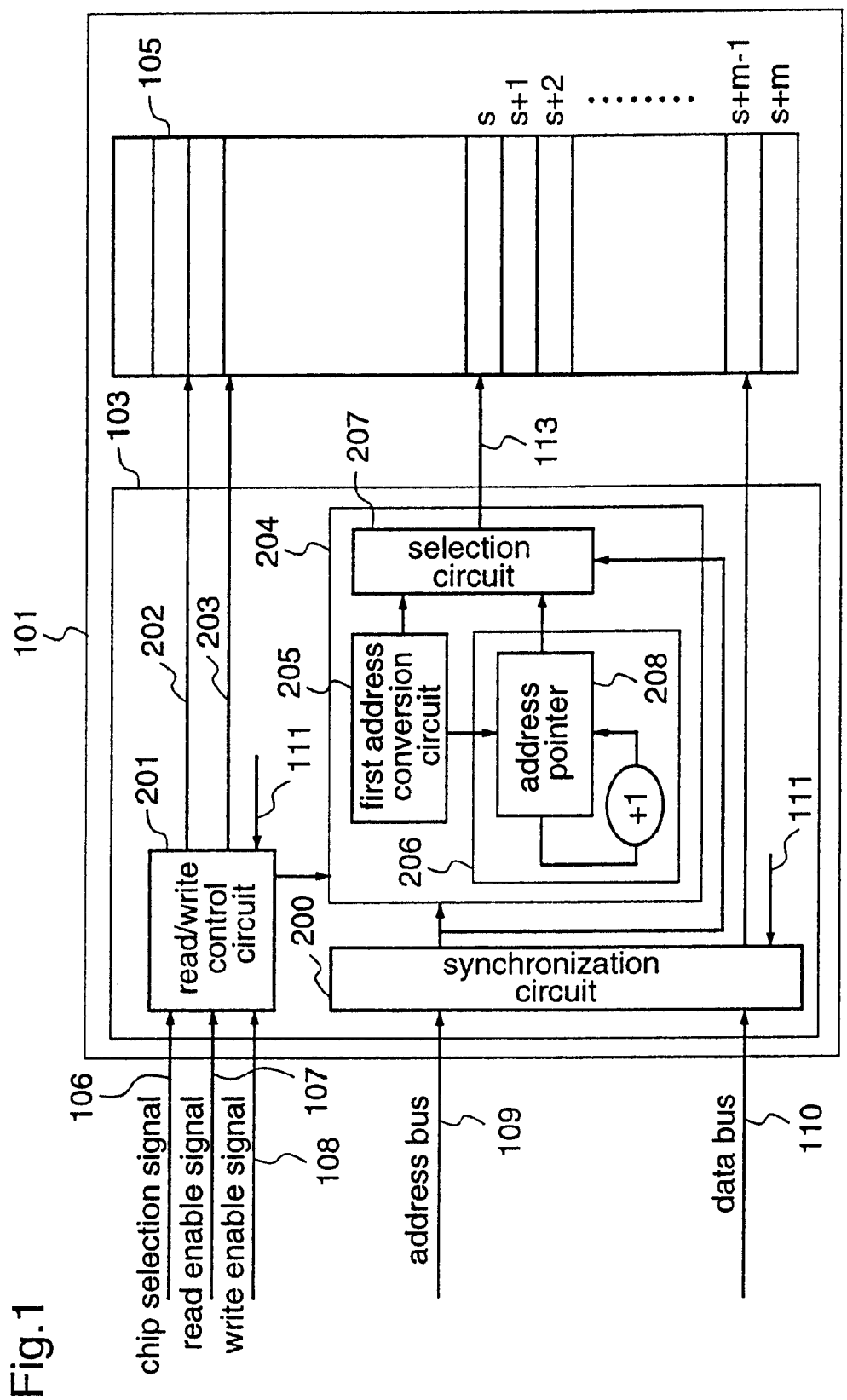
FIG. 1 is a block diagram illustrating the hardware structure of a host interface circuit according to a first embodiment of the present invention.

FIG. 1 is a block diagram illustrating the hardware structure of a host interface circuit 103 according to the first embodiment. In FIG. 1, 101 denotes a video coding/decoding apparatus connected to an external host controller (not shown), and contains the host interface circuit 103. Further, the video coding/decoding apparatus 101 is provided with an internal storage space 105. The host interface circuit 103 and the external host controller are connected through a chip selection signal 106, a read enable signal 107, a write enable signal 108, an address bus 109, and a data bus 110.

The host interface circuit 103 is provided with a synchronization circuit 200, a read/write control circuit 201, and an address generation circuit 204. The synchronization circuit 200 synchronizes a signal from the external host controller which operates asynchronously with the video coding/decoding apparatus 101, with an internal operation clock 111. The read/write control circuit 201 generates an internal read signal 202 and an internal write signal 203 to an internal storage space 105. The address generation circuit 204 generates internal addresses corresponding to the internal storage space 105, from external addresses supplied from the external host controller.

The address generation circuit 204 comprises a first address conversion circuit 205, a second address conversion circuit 206, and an selection circuit 207. The first address conversion circuit 205 converts the respective external addresses (first addresses) in an internal storage space of the external host controller into internal addresses 113 in the internal storage space 105 of the video coding/decoding apparatus 101 so that the internal addresses 113 are in one-to-one correspondence with the external addresses (first addresses). The second address conversion circuit 206 converts a specific external address (a second address) for making continuous access to a series of areas in the internal storage space 105 into internal addresses 113. The selection circuit 207 selects either the first address conversion circuit 205 or the second address conversion circuit 206, according to the external address supplied from the external host controller.

Next, the operation of the host interface circuit 103 according to the first embodiment will be described with reference to FIG. 2, with respect to the case where the external host controller transmits coded video data to the video coding/decoding apparatus 101, and the case where the external host controller receives coded video data from the video coding/decoding apparatus 101.

Figure 2:
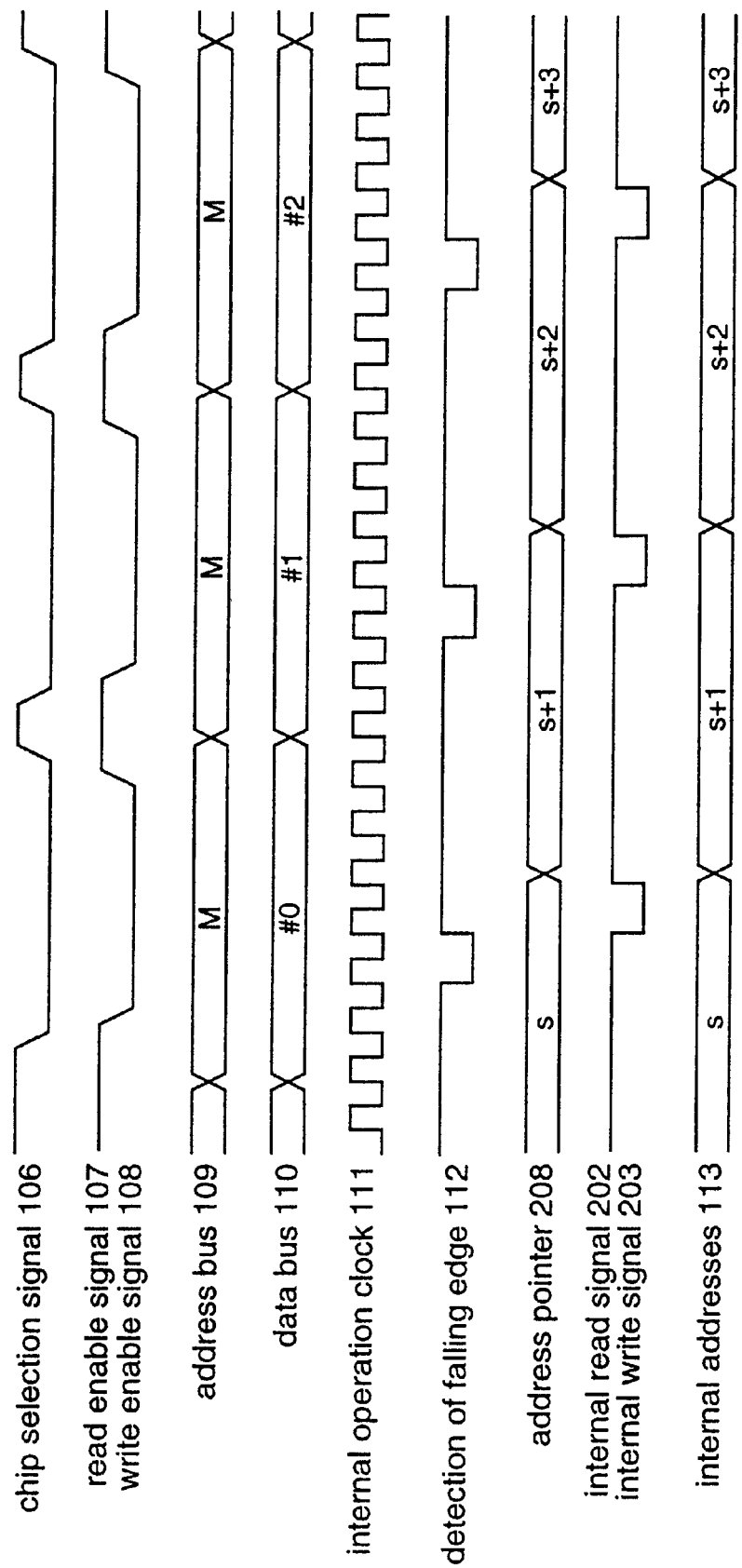
FIG. 2 is a timing chart for explaining data transmission/reception between the host interface circuit according to the first embodiment and an external host controller.

FIG. 2 is a timing chart for explaining data transmission/reception between the external host controller and the video coding/decoding apparatus 101 containing the host interface circuit 103.

Initially, a description will be given of the case where the external host controller transmits coded video data to the video coding/decoding apparatus 101.

The external host controller generates external addresses (first addresses) corresponding to the respective internal addresses in the internal storage space 105 of the video coding/decoding apparatus 101 that is connected to the external host controller, and writes control commands such as the type of data to transmit, the data size, and the like, into the internal addresses in the internal storage space 105 corresponding to the external addresses.

Then, the external host controller sets a head address s of an area in the internal storage space 105 of the video coding/decoding apparatus 101, where coded video data transmitted from the external host controller are to be written, on an address pointer 208 in the second address conversion circuit 206. Thereafter, the external host controller transmits a specific external address (a second address) M corresponding to the coded video data to transmit, together with the chip selection signal 106 and the write enable signal 108, through the address bus 109, to the video coding/decoding apparatus 101. Then, as shown in the timing chart of FIG. 2, the specific external address (second address) M is converted into the corresponding internal addresses 113 by the second address conversion circuit 206, and the coded video data are written in the internal storage area assigned by the internal addresses 113.

Further, the read/write control circuit 201 in the host interface circuit 103 detects the falling edges of the chip selection signal 106 and the write enable signal 108 from the external host controller, in synchronization with the internal operation clock 111 (112 in FIG. 2), thereby judging that the external host controller performs writing of data. When the external address given to the address bus 109 at this time is the specific address (second address) M for making continuous access to a series of areas in the internal storage space 105 of the video coding/decoding apparatus 101, the second address conversion circuit 206 is selected by the selection circuit 207, and the address value (s, s+1, . . . , s+m−1, s+m) outputted from the address pointer 208 is selected as the internal address 113 of the internal storage space 105, and the data transmitted from the external host controller is written in this address and, further, the value of the address pointer is incremented by 1. This operation is repeated for the amount of data to be transmitted from the external host controller as shown in FIG. 2.

Next, a description will be given of the case where the external host controller receives coded video data from the video coding/decoding apparatus 101.

The external host controller generates external addresses (first addresses) corresponding to the respective internal addresses in the internal storage space 105 of the video coding/decoding apparatus 101 that is connected to the controller, and writes control commands such as the type of data to receive, the data size, and the like, into the internal addresses in the internal storage space 105 corresponding to the external addresses (first addresses).

The video coding/decoding apparatus 101 makes preparation for transmission of coded video data to the external host controller, according to the control commands transmitted from the external host controller. When the preparation has been made, the video coding/decoding apparatus 101 notifies it to the external host controller. This notification is carried out by interruption to the external host controller, or polling to a status register from the external host controller.

On receipt of the notification, the external host controller sets a head address s of an area in the internal storage space 105 where the coded video data to receive are stored, on the address pointer 208 in the second address conversion circuit 206. Thereafter, the external host controller transmits the specific external address (second address) M corresponding to the coded video data to receive, together with the chip selection signal 106 and the read enable signal 107, through the address bus 109, to the video coding/decoding apparatus 101. Then, as shown in the timing chart of FIG. 2, the specific external address (second address) M is converted into the corresponding internal addresses 113 by the second address conversion circuit 206, and the coded video data are read from the internal addresses.

Further, the read/write control circuit 201 in the host interface circuit 103 detects the falling edges of the chip selection signal 106 and the write enable signal 108 from the external host controller, in synchronization with the internal operation clock 111, thereby judging that the external host controller performs reading of data. When the external address given to the address bus 109 at this time is the specific address (second address) M for making continuous access to a series of areas in the internal storage space 105 of the video coding/decoding apparatus 101, the second address conversion circuit 206 is selected by the selection circuit 207, and the address value (s, s+1, . . . , s+m−1, s+m) outputted from the address pointer 208 is selected as the internal address 113, and the corresponding data is read from the internal storage space 105 to be transmitted to the external host controller and, further, the value of the address pointer is incremented by 1. This operation is repeated for the amount of data to be received by the external host controller as shown in FIG. 2.

When making continuous access to a series of areas in the internal storage space 105 of the video coding/decoding apparatus 101 by using the specific external address (second address) M, the access size m is determined considering the capacity of the physical storage space that is contained in the video coding/decoding apparatus 101.

When performing data transmission/reception between the external host controller and the video coding/decoding apparatus 101, data are usually transmitted/received in units of predetermined number of bytes. For example, assuming that coded video data are transmitted/received in units of 256 bytes, signal transitions occur in the lower 8 bits of the external address bus 109 in the conventional host interface circuit. To be specific, in each signal line of the external address bus 109, low-to-high signal transitions and high-to-low signal transitions occur 256 times at the 0th bit, 128 times at the 1st bit, 64 times at the 2nd bit, 32 times at the 3rd bit, 16 times at the 4th bit, 8 times at the 5th bit, 4 times at the 6th bit, and 2 times at the 7th bit. However, in the host interface circuit 103 according to the first embodiment, since the specific external address (second address) is used when coded video data are transmitted in units of predetermined number of bytes, such signal transition hardly occurs.

Further, in general, a power Pd that is consumed by charging and discharging due to signal transition is represented by the following formula.

$$Pd = \alpha \cdot C \cdot fp \cdot V \cdot V \quad (1)$$

wherein α is the signal transition rate, C is the load capacity to be driven, fp is the operating frequency, and V is the power supply voltage. It can be seen from formula (1) that the power Pd consumed by charging and discharging due to signal transition increases in proportion to the signal transition rate α and the load capacity C when the operating frequency fp and the power supply voltage V are constant. That is, the power Pd can be reduced by reducing the signal transitions on the external address bus.

Accordingly, in the host interface circuit 103 according to the first embodiment, the power consumption can be significantly reduced as compared with that in the conventional host interface circuit.

In this first embodiment, since the host interface circuit 103 includes the second address conversion circuit 206 for generating addresses in the internal storage space 105 corresponding to the specific external address (second address), the power consumption inside the video coding/decoding apparatus 101 is larger than that in the conventional device. However, since the host interface circuit 103 is in an LSI, and the power required to drive the gates in the LSI is only several $\mu$W order while the power required to drive an external device having a large load capacity is several mW order. Therefore, if the signal transitions on the external address bus 109 can be significantly reduced, the power consumption of the LSI as a whole can be reduced.

According to the first embodiment of the invention, when the host interface circuit 103 performs continuous transmission/reception of coded video data between the external host controller and the video coding/decoding apparatus 101, the host interface circuit 103 uses the specific address (second address) M for making continuous access to a series of areas in the internal storage space 105 of the video coding/decoding apparatus 101, whereby signal transitions on the external address bus 109 are significantly reduced. Further, since DMA is not used for making continuous access to a series of areas in the internal storage space 105, the hardware scale is prevented from increasing, and the software processing of the external host controller is prevented from being complicated.

[Embodiment 2]

Hereinafter, a second embodiment of the present invention will be described.

A host interface circuit according to the second embodiment is further provided with means for simplifying the software processing of the external host controller when transmitting/receiving plural pieces of coded video data, or different kinds of data such as coded video data and coded audio data.

First of all, the structure of a host interface circuit according to the second embodiment will be described with reference to FIG. 3.

Figure 3:
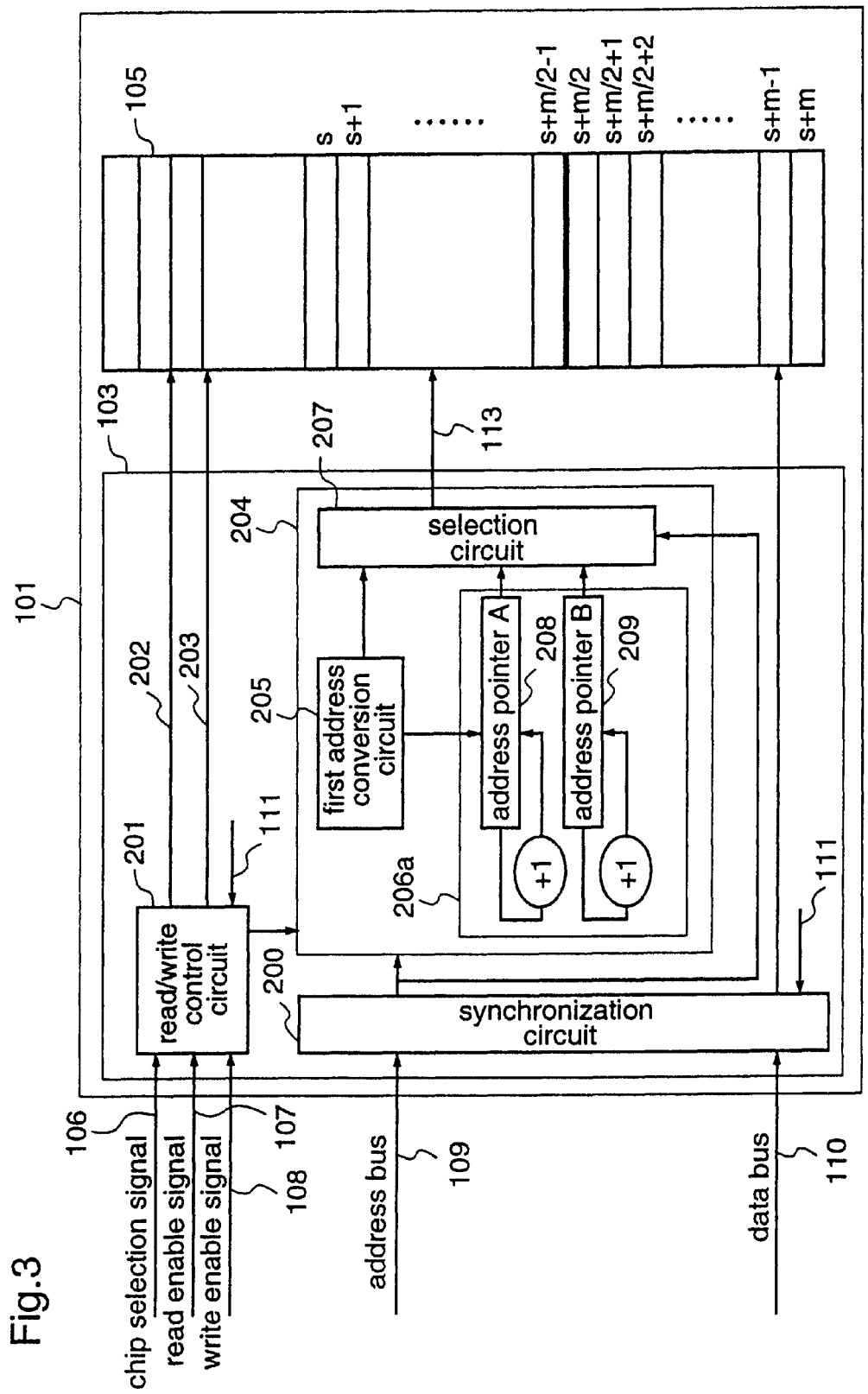
FIG. 3 is a block diagram illustrating the hardware structure of a host interface circuit according to a second embodiment of the present invention.

FIG. 3 is a block diagram illustrating the hardware structure of a host interface circuit 103 according to the second embodiment. In FIG. 3, the same reference numerals as those shown in FIG. 1 designate the same or corresponding parts.

With reference to FIG. 3, in the host interface circuit 103, an address generation circuit 206a is provided with two address pointers A208 and B209, and the external host controller generates two specific addresses M0 and M1 (second addresses) used for continuous access to a series of areas in the internal storage space 105 of the video coding/decoding apparatus 101 that is connected to the external host controller. The external addresses M0 and M1 correspond to the address pointers A208 and B209, respectively.

Hereinafter, a description will be given of the access size when making, using the specific external addresses M0 and M1, continuous access to a series of areas in the internal storage space 105 of the video coding/decoding apparatus 101 connected to the external host controller.

Figure 4A:
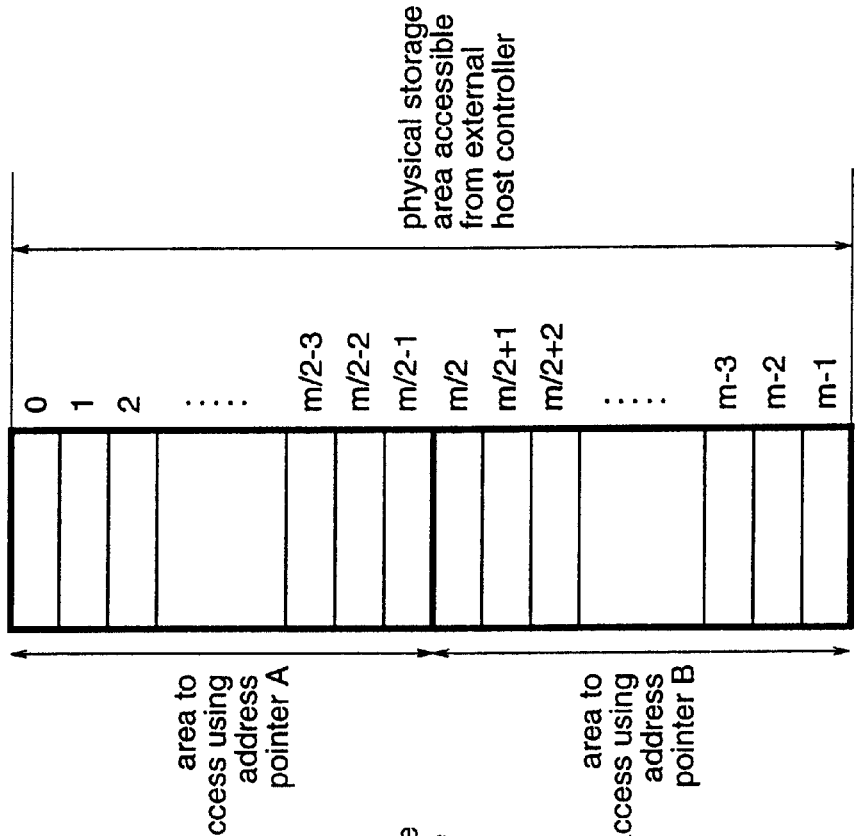
FIGS. 4(a) and 4(b) are diagrams illustrating, when transmitting/receiving data streams using specific external addresses (second addresses), allocation of storage areas in an internal storage space of a video coding/decoding apparatus where the transmitted/received data are stored.
Figure 4B:
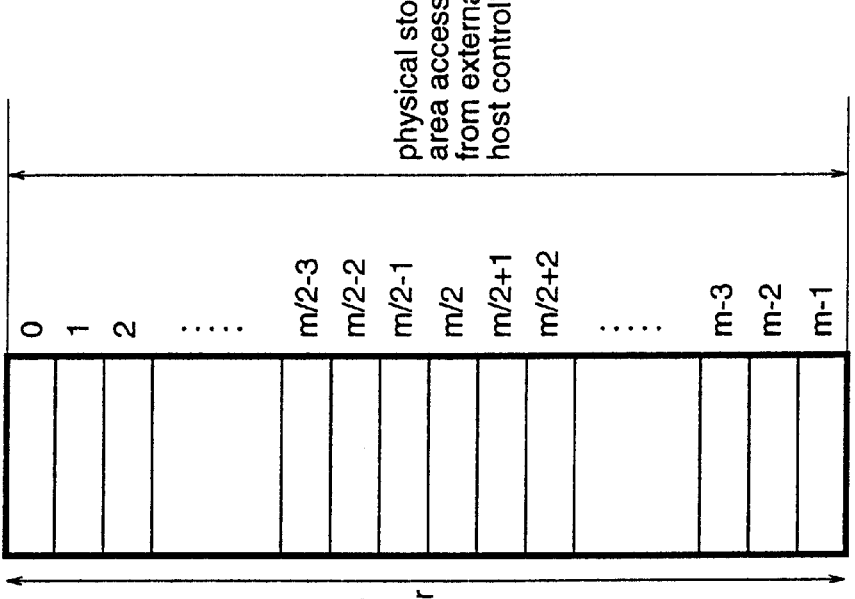

FIGS. 4(a) and 4(b) are diagram for explaining allocation of storage areas in the internal storage space 105 of the video coding/decoding apparatus 101, where data to be transmitted/received are stored. To be specific, FIG. 4(a) shows allocation of storage areas in the internal storage space when a single (one kind of) data stream is transmitted/received, and FIG. 4(b) shows allocation of storage areas in the internal storage space when plural (two kinds of) data streams are transmitted/received. In this second embodiment, for transmission/reception of two data streams, the internal storage space 105 is evenly allocated to the two data streams to be transmitted/received.

Assuming that the physical storage space in the video coding/decoding apparatus 101 connected to the external host controller has a capacity of m bytes, a data stream of m bytes can be transmitted/received at one time by using the specific external address (second address) M as shown in FIG. 4(a), and a data stream of m/2 bytes can be transmitted/received at one time by using the specific external address (second address) M0 or M1 as shown in FIG. 4(b).

It is now assumed that, until the external host controller has transmitted a data stream, the video coding/decoding apparatus 101 does not perform processing on the received data stream. Under this assumption, when a data stream more than m bytes (FIG. 4(a)) or a data stream more than m/2 bytes (FIG. 4(b)) is transmitted from the external host controller to the video coding/decoding apparatus 101, the transmitted data stream overwrites the data stream stored in the video coding/decoding apparatus 101 before the stored data stream is processed. Therefore, in the software processing of the external host controller, data transmission/reception should be carried out considering the capacity of the physical storage space contained in the video coding/decoding apparatus 101 that is accessible from the external host controller.

To be specific, when making continuous access to a series of areas in the internal storage space 105 of the video coding/decoding apparatus by using the specific external address M or the specific external addresses M0 and M1, the access size m is determined considering the capacity of the physical storage space contained in the video coding/decoding apparatus 101.

Next, the operation of the host interface circuit according to the second embodiment will be described.

In the host interface circuit 103, the read/write control circuit 201 detects the falling edges of the chip selection signal 106 and the read enable signal 107 or the write enable signal 108 supplied from the external host controller, in synchronization with the internal operation clock 111, thereby judging that the external host controller performs data reading or writing. At this time, when the external address given to the address bus 109 is the specific external address (second address) M0 or M1 for making continuous access to a series of areas in the internal storage space 105, the selection circuit 207 selects the address pointer A208 or B209 as the internal address 113 of the internal storage space 105, and data is written in the internal storage space 105 or read from the space 105 to be outputted to the external host controller and, simultaneously, the value of the address pointer A208 or B209 corresponding to the specific external address M0 or M1, respectively, is incremented by 1. This operation is repeated for the amount of data to be transmitted/received by the external host controller, as described for the first embodiment.

When the internal storage space 105 of the video coding/decoding apparatus 101 is evenly allocated to accesses by the specific external addresses (second addresses) M0 and M1, the host interface circuit 103 makes access to the internal address areas of s, s+1, s+2, . . . , s+m/2−1 by the address pointer A208 when the specific external address is M0. On the other hand, the host interface circuit 103 makes access to the internal address areas of s+m/2, s+m/2+1, s+m/2+2, . . . , s+m by the address pointer B209 when the specific external address is M1.

The host interface circuit 103 of this second embodiment is applicable to MPEG4 that is the international standard of video coding. In MPEG4, an image displayed on a screen is composed of plural objects, and the respective objects constituting the image are coded separately. Accordingly, plural pieces of coded video data are transmitted/received between the video coding/decoding apparatus 101 and the external host controller.

Therefore, when there is only one set of a specific external address (second address) and an address pointer for making continuous access to a series of areas in the internal storage space 105, in order to transmit/receive the plural pieces of coded video data, the external host controller must set the head address of coded video data to be transmitted/received every time transmission/reception of the coded video data is started and, moreover, the external host controller must store the storage addresses of the coded video data to be transmitted/received, resulting in complicated software processing of the external host controller. In order to solve this problem, the plural pieces of coded video data are provided with the specific external addresses (second addresses), respectively, and the host interface circuit 103 is provided with the address pointers corresponding to the respective external addresses, whereby the software processing of the external host controller is prevented from being complicated.

As described above, according to the second embodiment of the invention, the host interface circuit 103 can reduce the power consumption due to signal transition, as described for the first embodiment. Moreover, since the host interface circuit 103 uses the specific external addresses (second addresses) corresponding to different kinds of coded streams, and the address pointers corresponding to the respective external addresses, the software processing of the external host controller can dispense with setting of a head address of coded video data every time transmission/reception of coded video data is started, and storage of addresses of coded image data to be transmitted/received. As the result, the software processing of the external host controller is prevented from being complicated.

While in the second embodiment the second address conversion circuit 206*a* generates two specific external addresses (second addresses) and is provided with two address pointers corresponding to the respective external addresses, the number of the specific external addresses and the address pointers is not restricted to two.

[Embodiment 3]

Hereinafter, a description will be given of a third embodiment of the present invention.

A host interface circuit of this third embodiment is further provided with means for simplifying the software processing of the external host controller, when making access to the internal storage space 105 in the video coding/decoding apparatus 101 connected to the external host controller, by using a specific address (second address) for making continuous access to a series of areas in the internal storage space 105.

Initially, the structure of the host interface circuit according to the third embodiment will be described with reference to FIG. 5.

Figure 5:
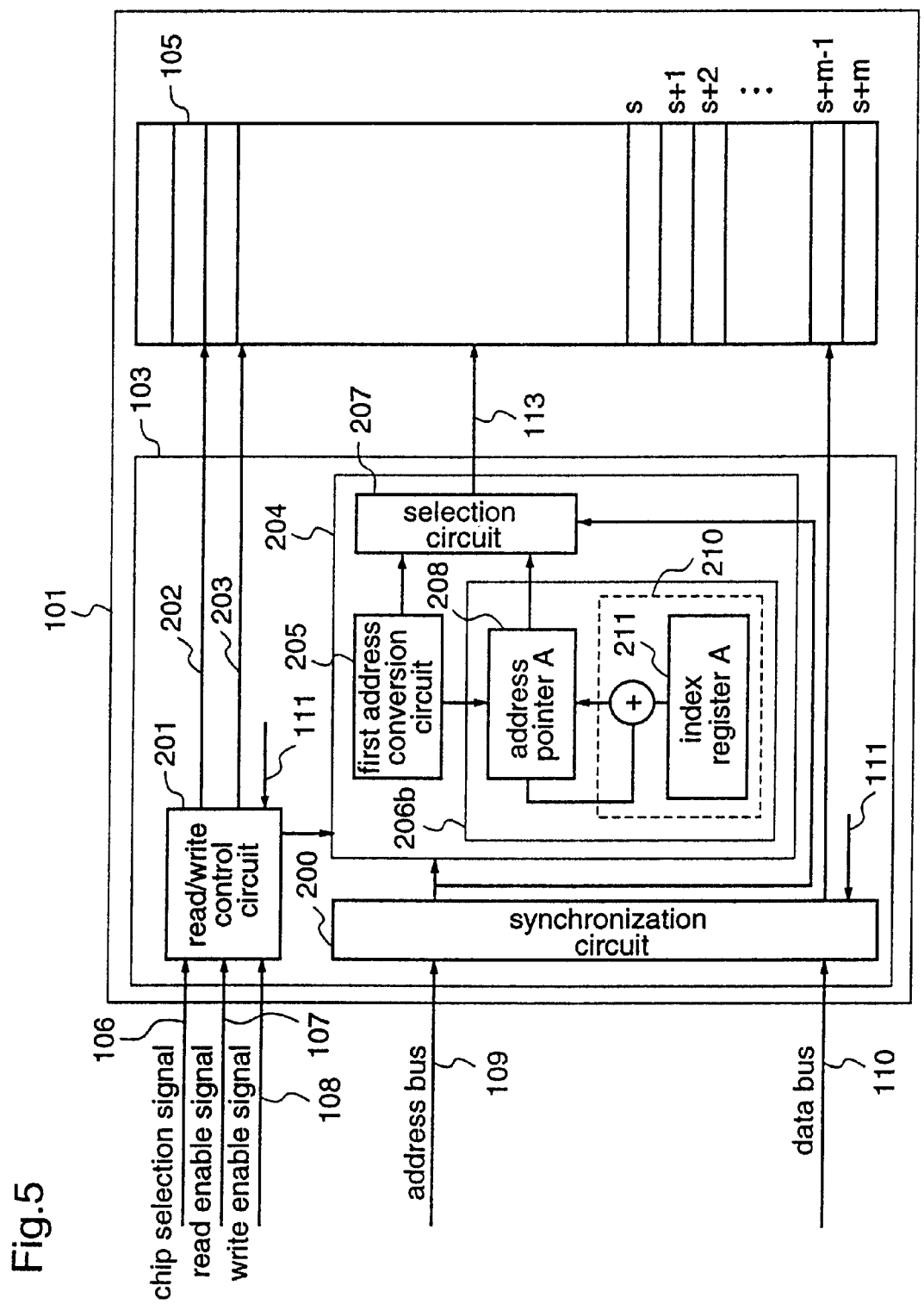
FIG. 5 is a block diagram illustrating the hardware structure of a host interface circuit according to a third embodiment of the present invention.

FIG. 5 is a block diagram illustrating the hardware structure of a host interface circuit 103 according to the third embodiment. In FIG. 5, the same reference numerals as those shown in FIG. 1 denote the same or corresponding parts.

In the host interface circuit 103 shown in FIG. 5, when a series of areas in the internal storage space 105 of the video coding/decoding apparatus 101 connected to the external host controller are continuously accessed by using a specific external address (second address), the address pointer A208 in the second address conversion circuit 206*b* for generating internal addresses 113 of the internal storage space 105 from the specific external address (second address) is provided with an address generation control circuit 210 for controlling address generation. Further, the address generation control circuit 210 includes an index register A211.

Next, the operation of the host interface circuit 103 according to the third embodiment will be described with reference to FIGS. 6 and 7. In this third embodiment, access to two-dimensional array data is taken as an example.

FIGS. 6(*a*) and 6(*b*) are diagrams illustrating data storage positions when two-dimensional array data (FIG. 6(*a*)) are stored in the internal storage space 105 that is a one-dimensional array (FIG. 6(*b*)). FIG. 7 is a timing chart for explaining data transmission/reception between the video coding/decoding apparatus containing the host interface circuit 103 and the external host controller.

In the host interface circuit 103, the address generation control circuit 210 prepares a plurality of address generation methods for generating addresses in the internal storage space 105, and the falling edges (112 in FIG. 7) of the chip selection signal 106 and the read enable signal 107 or the write enable signal 108 supplied from the external host controller are detected in synchronization with the internal operation clock 111 to judge that the external host controller performs data reading or writing. When the external address given to the address bus 109 at this time is the specific address (second address) M0 for making continuous access to a series of areas in the internal storage space 105, the address generation control circuit 210 generates internal addresses 113 to the address pointer A208, according to an address generation method designated by the external host controller.

When the external host controller makes continuous access to a series of areas in the column direction of the two-dimensional array data stored in the internal storage space 105, the external host controller can use the specific address (second address) M0 for continuous access to the serial areas in the internal storage space 105, as described for the first and second embodiments.

However, when the external host controller makes continuous access to a series of areas in the row direction of the two-dimensional array data, the external host controller cannot make continuous access to the serial areas in the internal storage space 105 by using the specific address (second address) M0 in the method where the address pointer A208 for generating the internal addresses 113 is one by one incremented for every specific address (second address) M0.

For example, with reference to FIGS. 6(*a*) and 6(*b*), when the external host controller makes continuous access to the two-dimensional array data in the row direction by using the specific address (second address) M0, the address pointer A208 for generating the internal addresses 113 must be incremented by t at a time.

Accordingly, when data are arranged in two-dimensional array as shown in FIG. 6(*a*), since the host interface circuit 103 according to the first or second embodiment cannot make continuous access to the serial areas in the internal storage space 105 by using the specific address (second address) M0, the external host controller must generate, for continuous access, plural external addresses (first addresses) in one-to-one correspondence with the internal addresses in the internal storage space 105. That is, every time the external host controller makes access to the internal address in the storage space 105, the controller must generate the corresponding external address, resulting in power consumption due to signal transition of the external address.

In order to solve this problem, in this third embodiment, the address generation control circuit 210 is provided with the index register A211 as shown in FIG. 5, and the address generation control circuit 210 generates plural kinds of methods of updating the address pointer A208 with respect to the specific address (second address) M0 for making continuous access to the serial areas in the internal storage space 105, i.e., plural kinds of access orders to the internal storage space 105. The access orders are set by the external host controller.

When the external host controller makes access to the internal storage space 105 in the column direction of the two-dimensional array data shown in FIG. 6(*a*), a head address s for making access to the internal storage space 105 is set in the address pointer A208 shown in FIG. 5, and t is set in the index register A211 as a value to update the address pointer A208, as shown in the timing chart of FIG. 7. The address generation control circuit 210 updates the address pointer A208 by the value t that is set in the index register A211, at every access using the specific address (second address) M0, whereby the address pointer A208 is updated like s, s+t, s+2t, . . . In this way, continuous access to D(0,0), D(1,0), D(2,0), . . . is achieved using the specific address (second address) M0, in the row direction of the two-dimensional array data shown in FIG. 6(a).

Furthermore, when using the above-mentioned access method, setting of the head address s for initial access and the index value t is all that is required of the external host controller, and the external host controller doesn't need to perform the process of updating the external address at every access.

As described above, according to the third embodiment of the invention, the host interface circuit 103 is further provided with the address generation control circuit 210, and the address generation control circuit 210 provides plural kinds of address generation methods for generating addresses in the internal storage space 105 of the video coding/decoding apparatus 101, with respect to access using the specific external address (second address). Thereby, it is possible to make continuous access to a series of areas in the internal storage space 105 using the specific external address (second address) with respect to plural access modes performed by the external host controller. As the result, power consumption due to signal transition on the external address bus is reduced as described for the first embodiment and, moreover, the software processing of the external host controller is prevented from being complicated.

While in this third embodiment the second address conversion circuit 206b is provided with one address pointer and one address generation circuit including an index register, when plural kinds of data, such as still-picture data and video data, are handled and thereby plural pieces of specific external addresses (second addresses) are provided, the second address conversion circuit 206b is provided with plural address pointers and plural address generation circuits as many as the external addresses.

[Embodiment 4]

Hereinafter, a fourth embodiment of the present invention will be described.

Figure 9:
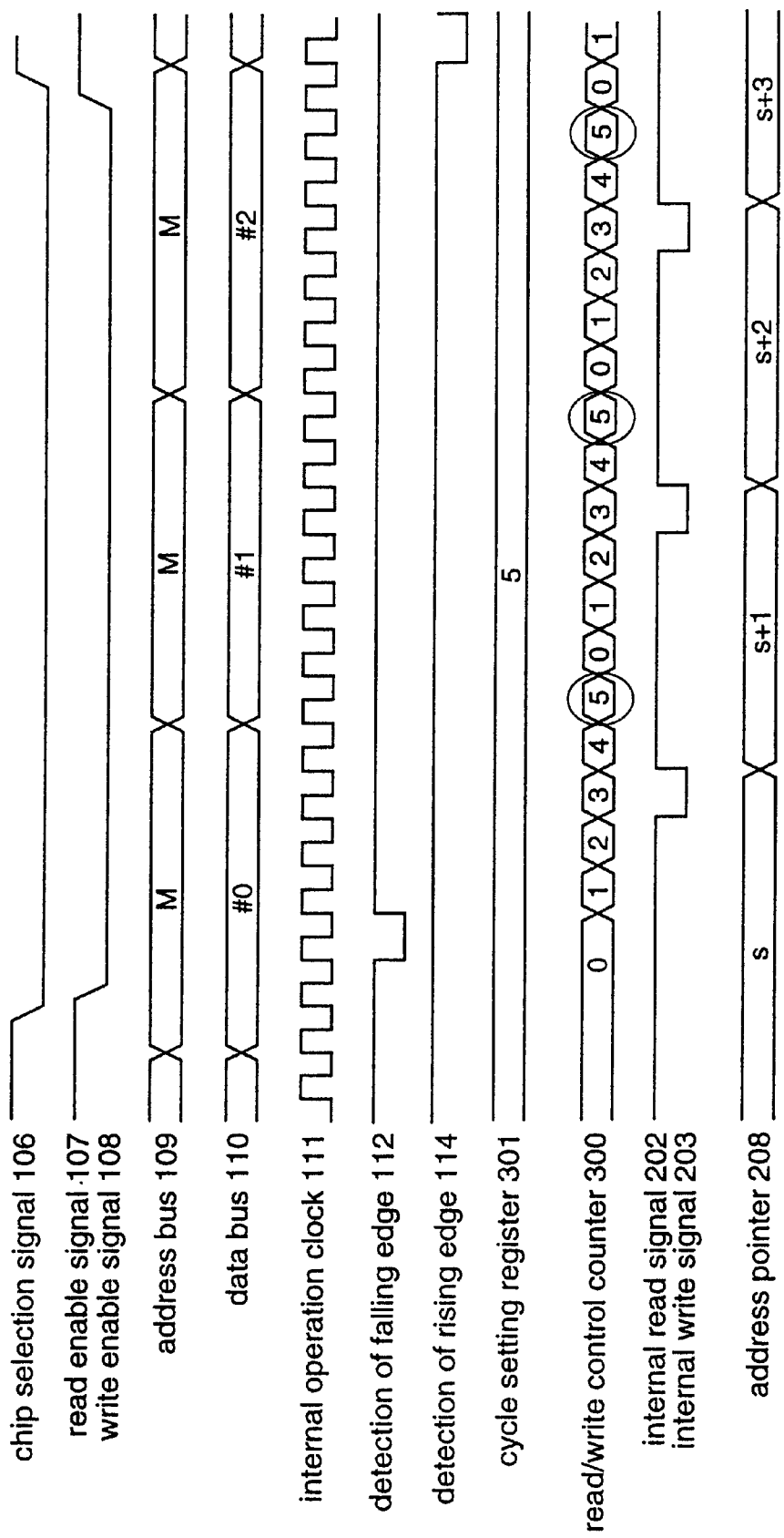
FIG. 9 is a timing chart for explaining data transmission/reception between the host interface circuit of the fourth embodiment and an external host controller.
Figure 10:
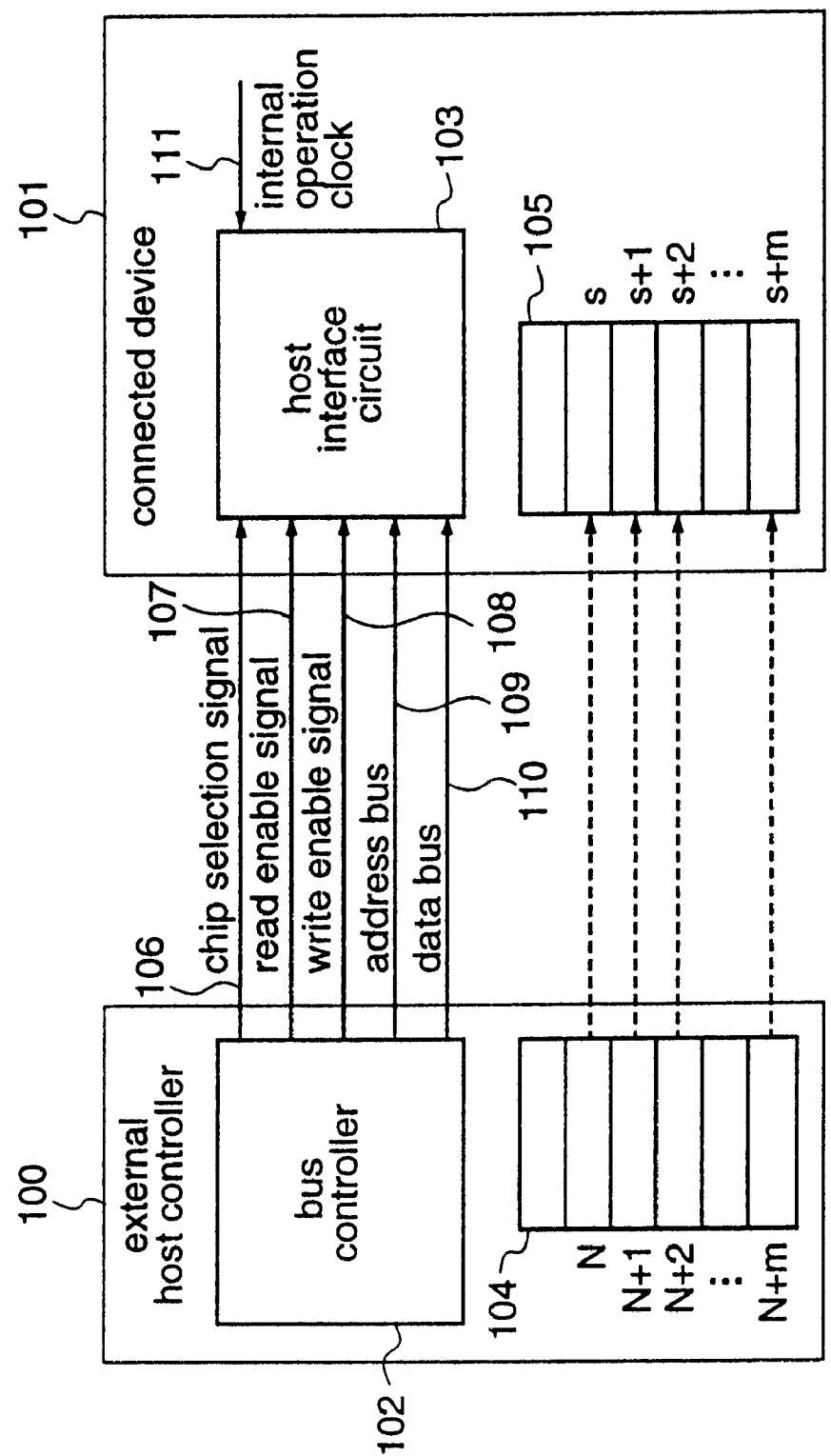
FIG. 10 is a block diagram illustrating the structure of a conventional host interface circuit.
Figure 11:
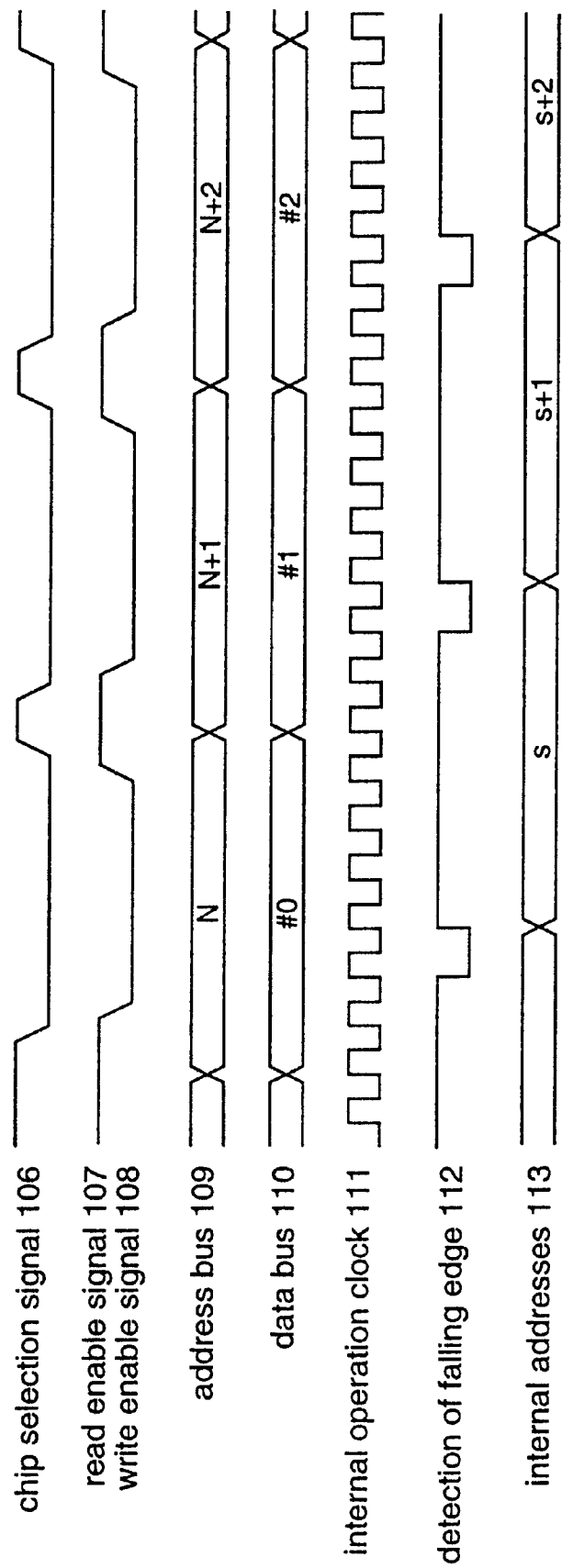
FIG. 11 is a timing chart for explaining the manner of making continuous access to a series of areas in an internal storage space of a device connected to an external host controller, using the conventional host interface circuit.
Figure 12:
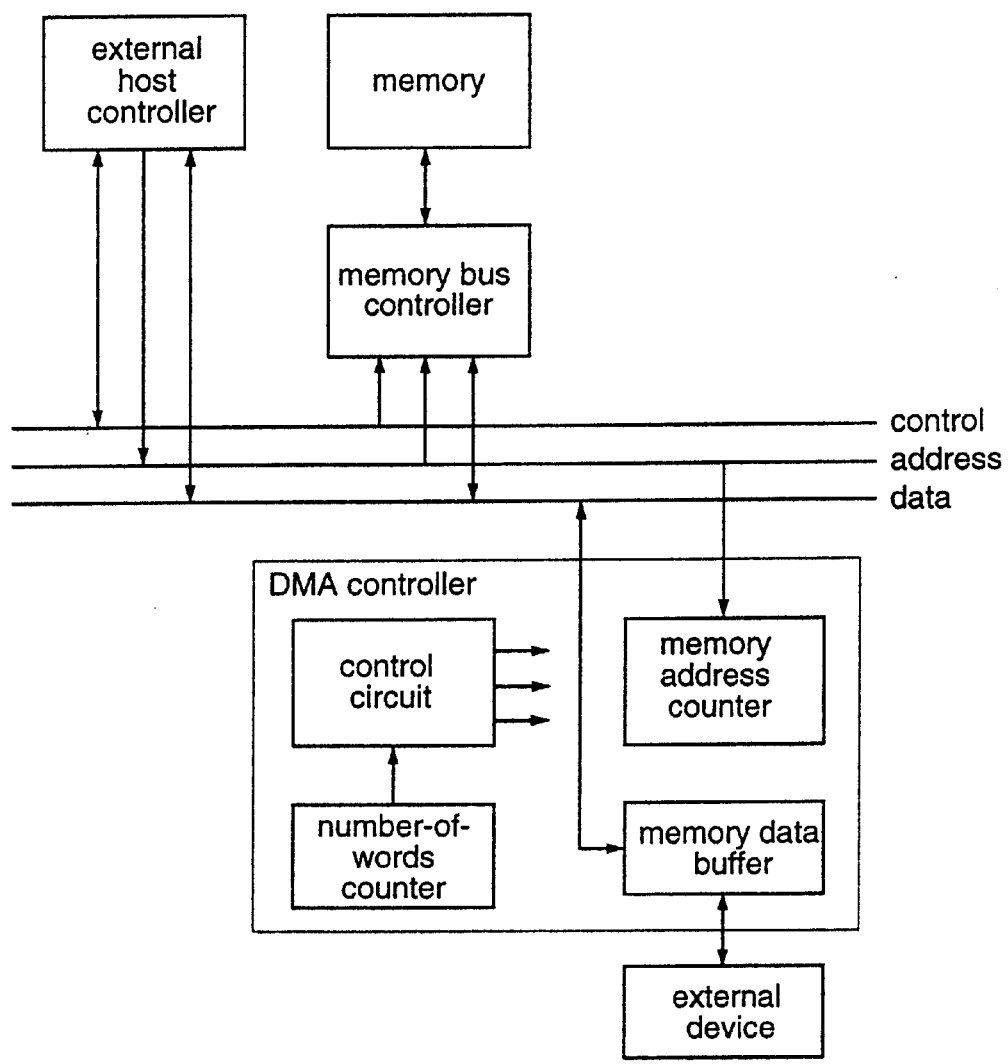
FIG. 12 is a block diagram illustrating a hardware structure for explaining conventional direct memory access.

In this fourth embodiment, a host interface circuit according to any of the first to third embodiments is modified to realize reading or writing of data from/into the internal storage space of the external host controller, in the case where, as shown in FIG. 9, the chip selection signal 106 and the read enable signal 107 or the write enable signal 108 supplied from the external host controller are continuously asserted with respect to continuous data reading or writing.

FIG. 9 is a timing chart for explaining data transmission/reception between the video coding/decoding apparatus 101 containing the host interface circuit of this fourth embodiment, and the external host controller.

In the case where the external host controller and the video coding/decoding apparatus 101 connected to the host controller operate on different clocks, when the read enable signal 107 or the write enable signal 108 is asserted before starting reading or writing of each address and data and is negated when the reading or writing is ended as shown in the timing chart of FIG. 2 described for the first embodiment, the host interface circuit 103 in the video coding/decoding apparatus 101 detects the falling edges of the chip selection signal 106 and the read enable signal 107 in synchronization with the internal operation clock 111 (112 in FIG. 2) to judge that reading of data from the internal storage space 105 is carried out and, furthermore, the host interface circuit 103 detects the falling edges of the chip selection signal 106 and the write enable signal 108 (112 in FIG. 2) to judge that writing of data into the internal storage space 105 is carried out.

However, as shown in the timing chart of FIG. 9, when the read enable signal 107 or the write enable signal 108 is continuously asserted with respect to continuous reading or writing of plural addresses and data from/into the external host controller, even if the falling edges of the chip selection signal 106 and the read enable signal 107 or the write enable signal 108 are detected in synchronization with the internal operation clock 111, the boundaries of addresses and the boundaries of data cannot be detected in the continuously carried-out reading or writing of the addresses and data.

In the conventional access method using the external addresses in one-to-one correspondence with the internal addresses, the boundaries of addresses or data can be detected as the external address varies. However, when using the specific address (second address) for making continuous access to a series of areas in the internal storage space 105 of the video coding/decoding apparatus 101 connected to the external host controller as described for the first to third embodiments, the boundaries of addresses or data cannot be detected as the external address does not vary.

Hereinafter, the structure of the host interface circuit 103 according to this fourth embodiment will be described with reference to FIG. 8.

Figure 8:
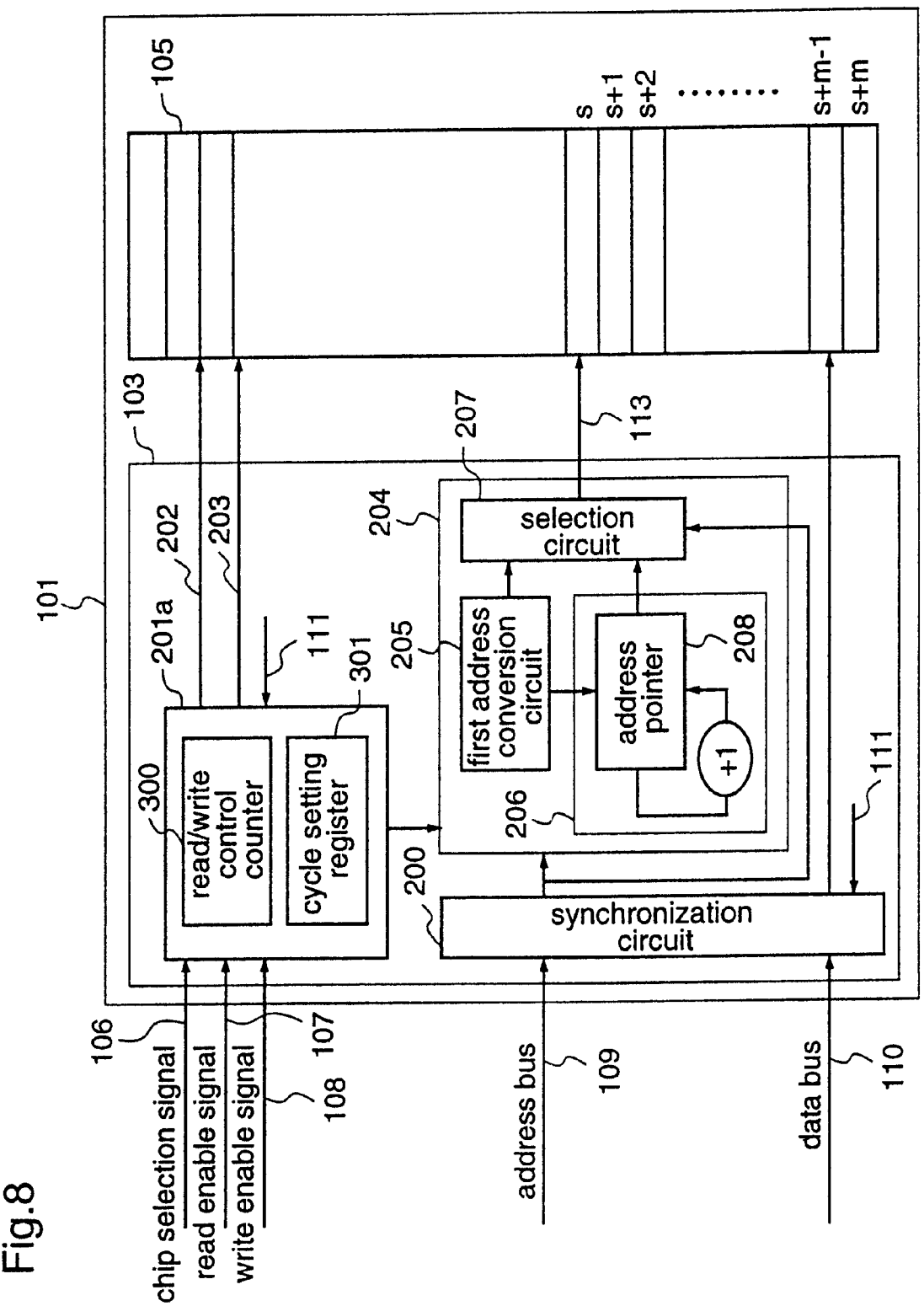
FIG. 8 is a block diagram illustrating the hardware structure of a host interface circuit according to a fourth embodiment of the present invention.

FIG. 8 is a block diagram illustrating the hardware structure of the host interface circuit 103 according to the fourth embodiment. In FIG. 8, the same reference numerals as those shown in FIG. 1 denote the same or corresponding parts.

In FIG. 8, a read/write control circuit 201a is provided with a read/write control counter 300 for controlling reading/writing of data from/into the internal storage space 105, and a cycle setting register 301 for setting the number of read/write cycles, in addition to a circuit for detecting falling edges (112 in FIG. 9) and rising edges (114 in FIG. 9) of the chip selection signal 106, the read enable signal 107, and the write enable signal 108, in synchronization with the internal operation clock 111.

Next, the operation of the host interface circuit 103 according to the fourth embodiment will be described with reference to FIGS. 2 and 9.

Initially, the read/write control counter 300 in the read/write control circuit 201a sets the count at 0 when it is reset. Next, in advance of reading or writing of data from/into the internal storage space 105, the external host controller sets a predetermined value in the cycle setting register 301, on the basis of the number of cycles required for reading or writing of data from/into the internal storage space 105 or the number of waits in the bus interface circuit of the external host controller, at timings of dropping the chip selection signal 106 and the read enable signal 107 or the write enable signal 108 for reading or writing one address and data, and raising these signals after performing reading or writing, as shown in the timing chart of FIG. 2 described for the first embodiment. In this fourth embodiment, the external host controller sets "5" in the cycle setting register 301.

Then, the read/write control circuit 201a detects, in synchronization with the internal operation clock 111, the falling edges of the chip selection signal 106 and the read enable signal 107 or the write enable signal 108, which are supplied from the external host controller that operates on a clock different from the internal operation clock 111, and the read/write control counter 300 starts counting at the timing when the falling edges of these signals are detected.

When the count of the read/write control counter 300 is "1" or "2", the synchronization circuit 200 samples the values of the external address and data which are given to the address bus 109 and the data bus 110 in synchronization with the internal operation clock 111, and when the count becomes "3", the read/write control circuit 201*a* generates an internal read signal 202 or an internal write signal 203 to the internal storage space 105, whereby reading or writing of data from the internal storage space 105 is carried out. This operation is repeated while the chip selection signal 106 and the read enable signal 107 or the write enable signal 108 are being asserted.

Then, the read/write control counter 300 resets the count to "0" to stop counting at the timing when the rising edges of the chip selection signal 106 and the read enable signal 107 or the write enable signal 108 are detected (114 in FIG. 9).

As described above, according to the fourth embodiment of the invention, since the host interface circuit 103 is provided with the read/write control circuit 300 and the cycle setting register 301, even when the read enable signal 107 or the write enable signal 108 is continuously asserted for continuous reading or writing of plural addresses and data from/into the external host controller, continuous reading or writing from/into a series of areas in the internal storage space 105 of the video coding/decoding apparatus 101 can be carried out using the specific address (second address). Thereby, signal transitions on the external address bus in the host interface circuit 103 are significantly reduced, resulting in reduced power consumption.

While in the first to fourth embodiments of the invention the read/write control circuit 201 (or 201*a*) detects the falling edges of the chip selection signal 106 and the read enable signal 107 (or the write enable signal 108) supplied from the external host controller, the read/write control circuit 201 (or 201*a*) may detect the rising edges of these signals, depending on the polarity (positive logic, negative logic) of the read enable signal 107 or the write enable signal 108.

What is claimed is:

1. A host interface circuit performing data transmission/reception between an external host controller and a device connected to the external host controller in such a manner that each address and data to be transmitted/received is accompanied with a chip selection signal indicating that the external host controller makes access to the device connected to the external host controller, and a read enable signal or a write enable signal, wherein:

said external host controller generates, as external addresses to be supplied to the device connected to the external host controller, first addresses corresponding to the respective internal addresses in an internal storage space of the device connected to the external host controller, and a specific second address corresponding to internal addresses of a series of areas in the internal storage space;

said host interface circuit includes:

a first address conversion circuit for converting the first addresses into the internal addresses in the internal storage space; and a second address conversion circuit for converting the specific second address into the internal addresses in the internal storage space; and the specific second address is used when the external host controller makes continuous access to the serial areas in the internal storage space of the device connected to the external host controller.

2. A host interface circuit as defined in claim 1, wherein:

said external host controller generates a plurality of specific second addresses corresponding to different kinds of data to be transmitted/received, respectively, as external addresses to be supplied to the device connected to the external host controller; and said host interface circuit includes a plurality of second address conversion circuits corresponding to the respective specific second addresses.

3. A host interface circuit as defined in claim 1, wherein:

said second address conversion circuit is provided with plural kinds of address generation methods for generating the internal addresses in the internal storage space corresponding to the specific second address, and generates the internal addresses corresponding to the specific second address by using any of the address generation methods according to setting of the external host controller.

4. A host interface circuit as defined in claim 2, wherein each of said second address conversion circuits is provided with plural kinds of address generation methods for generating the internal addresses in the internal storage space corresponding to the specific second address, and generates the internal addresses corresponding to the specific second address by using any of the address generation methods according to setting of the external host controller.

5. A host interface circuit as defined in claim 1, wherein:

said host interface circuit includes:

a register for setting an access cycle to a control signal which continuously asserts the read enable signal or the write enable signal during continuous transmission/reception of plural data by the external host controller; and a control circuit for controlling reading or writing of data from/into the internal storage space, according to the value set in the register; and when the external host controller continuously performs transmission/reception of plural pieces of data using the second address, with the device connected to the external host controller, the host interface circuit performs, under control of the control circuit, reading or writing of the respective data from the internal addresses generated by the second address conversion circuit.

\* \* \* \* \*